US010799992B2

(12) United States Patent
Yotz et al.

(10) Patent No.: US 10,799,992 B2
(45) Date of Patent: Oct. 13, 2020

(54) CLAMPING MECHANISM FOR HYDRAULIC WORK SUPPORT

(71) Applicant: VEKTEK, INC., Emporia, KS (US)

(72) Inventors: Gregory A. Yotz, Gridley, KS (US); Aaron Vernon Luthi, Madison, KS (US); Tyler Wayne Anliker, Emporia, KS (US); Michael Dean Swan, McPherson, KS (US)

(73) Assignee: Vektek, Inc., Emporia, KS (US)

( * ) Notice: Subject to any disclaimer, the term of this patent is extended or adjusted under 35 U.S.C. 154(b) by 847 days.

(21) Appl. No.: 14/841,883

(22) Filed: Sep. 1, 2015

(65) Prior Publication Data

US 2017/0057030 A1    Mar. 2, 2017

(51) Int. Cl.
  *B23B 31/30*      (2006.01)
  *B23Q 3/10*       (2006.01)
  *B23Q 3/08*       (2006.01)

(52) U.S. Cl.
  CPC ............ *B23Q 3/106* (2013.01); *B23B 31/305* (2013.01); *B23Q 3/082* (2013.01); *Y10T 279/1249* (2015.01); *Y10T 279/17435* (2015.01)

(58) Field of Classification Search
  CPC ........ B23Q 3/106; B23Q 1/28; B23B 31/305; B23B 31/204; B23B 31/202; B23B 31/402; F15B 15/262; Y10T 279/1283; Y10T 279/1249; Y10T 279/17435; Y10T 279/1037; B25B 5/065
  USPC .......... 269/78, 22, 309, 310; 279/46.4, 4.07; 74/531
  See application file for complete search history.

(56) References Cited

U.S. PATENT DOCUMENTS 3,311,383 A * 3/1967 Cox .................... B23B 31/4033
                                                      279/2.03
3,411,796 A * 11/1968 Decker ................ B23B 31/202
                                                      279/145
3,542,354 A * 11/1970 Fitzpatrick ............ B23B 31/305
                                                      269/22

(Continued)

FOREIGN PATENT DOCUMENTS

DE   202011051001   *  8/2012
DE   202011051001   * 10/2012
JP   WO03035323    *  5/2003

OTHER PUBLICATIONS

International Search Report for PCT Appln. No. PCT/U2016/018041; International Filing Date Feb. 16, 2016.

*Primary Examiner* — Orlando E Aviles
*Assistant Examiner* — Mahdi H Nejad
(74) *Attorney, Agent, or Firm* — Hovey Williams LLP

(57) ABSTRACT

A work support and method of clamping a translatable component of a hydraulic work support system. The work support may include a rigid, hollow slotted collet, a sleeve, and the translatable component, such as a plunger or rod. Hydraulic fluid may be pumped into an inlet of the hydraulic work support system to hydraulically actuate the translatable component outward from a first retracted position to a second extended position. The hydraulic fluid may further be pumped to the sleeve at a sufficient pressure that the sleeve presses against the collet. The collet responds thereto by flexing into contact with the translatable component, thus holding the translatable component in the second extended position. The slots in the collet allow for flexure even when using a thicker material with stronger column strength.

13 Claims, 14 Drawing Sheets

(56) References Cited

U.S. PATENT DOCUMENTS

| | | | | |
|---|---|---|---|---|
| 3,643,765 A | * | 2/1972 | Hanchen | F15B 15/262 |
| | | | | 188/170 |
| 3,980,325 A | * | 9/1976 | Robertson | F16L 19/08 |
| | | | | 285/249 |
| 4,423,880 A | * | 1/1984 | Kosmowski | B23B 31/204 |
| | | | | 279/4.07 |
| 4,979,911 A | * | 12/1990 | Spencer | H01R 9/0521 |
| | | | | 439/434 |
| 5,957,443 A | * | 9/1999 | Mascola | B23Q 3/108 |
| | | | | 269/22 |
| 5,979,267 A | * | 11/1999 | Yonezawa | B23Q 1/28 |
| | | | | 279/4.07 |
| 6,988,720 B2 | | 1/2006 | Kawakami | |
| 7,059,594 B2 | * | 6/2006 | Kawakami | B23Q 3/108 |
| | | | | 269/309 |
| 7,104,536 B2 | * | 9/2006 | Kitaura | B23Q 1/76 |
| | | | | 269/309 |
| 8,444,128 B2 | | 5/2013 | Karras et al. | |
| 8,944,438 B2 | * | 2/2015 | Andre | B23B 31/204 |
| | | | | 279/2.08 |
| 2003/0150304 A1 | | 8/2003 | Morgan | |
| 2004/0262855 A1 | * | 12/2004 | Andre, Sr. | B23B 31/305 |
| | | | | 279/2.08 |
| 2010/0050859 A1 | * | 3/2010 | Gray | F15B 15/262 |
| | | | | 92/26 |
| 2010/0052233 A1 | * | 3/2010 | Karras | B25B 5/061 |
| | | | | 269/24 |
| 2010/0253015 A1 | * | 10/2010 | Andre | B23B 31/204 |
| | | | | 279/2.08 |

* cited by examiner

CLAMPING MECHANISM FOR HYDRAULIC WORK SUPPORT

BACKGROUND

Hydraulic work supports are frequently used to support work pieces on fixtures so that the work pieces may be machined or otherwise acted upon by a computer numerical control (CNC) machine tool or the like. A typical work support may include a plunger (e.g., shaft or hollow rod) that moves axially by spring, air, or hydraulic force for positioning with respect to a work piece. The plunger may have a hardened contact bolt attached to its end for contacting the work piece.

The work support also includes a thin-walled, cylindrical stainless steel sleeve for transferring hydraulic pressure to the plunger. After the plunger is advanced, hydraulic pressure is applied to the outside of the sleeve to squeeze the sleeve against the plunger, thereby locking it against the work piece. The sleeve is typically very thin (e.g., 0.009 inch walls) in order to close and grip the plunger at the required pressure. Unfortunately, thin sleeves have a very low rigidity in axial compression, and high loads applied to the end of the work support plunger can result in elastic deformation to the sleeve inside the work support. This may cause the work support to deflect slightly, causing the same deflection of the work piece.

Furthermore, even though the sleeve is thin, it still requires substantial pressure to close a clearance between its internal diameter and the plunger. Therefore, this clearance is designed to be very small and with very tight tolerances (e.g., plunger outer diameter and sleeve inner diameter may require +/−0.0001 inch tolerance). This small clearance of the sleeve makes manufacturing very difficult, costly, and time consuming. Even changes in temperatures can cause a batch of resulting work pieces to measure out of tolerance. Furthermore, because the sleeve is very flexible, most measuring equipment causes the sleeve to distort and give inaccurate readings.

Another disadvantage is that the soft stainless steel sleeve can prematurely fail as a result of the sleeve's inner diameter becoming honed out, which increases the clearance enough that the sleeve cannot grip the plunger and the work support no longer has its rated capacity.

Another disadvantage is that the cylindrical sleeve does not make full contact when closed around its plunger, but rather distorts and only touches in a few places circumferentially with the plunger. Contact along a length of the plunger is also limited, with the sleeve contacting the plunger along the middle of its length, but not at the ends.

Thus, there is a need for a work support that overcomes these and other disadvantages of prior art work supports.

SUMMARY OF THE INVENTION

Embodiments of the present invention solve the above-mentioned problems and provide a distinct advance in the art of hydraulic work supports.

One embodiment of the invention is a clamping mechanism for a hydraulic work support system. The clamping mechanism may include a rod or plunger, a hollow, rigid collet, and a sleeve. The collet may have one or more sidewalls, a first open end, and a second open end, with a plurality of slots formed through the sidewalls. The sleeve may cover the collet while the collet surrounds the rod or plunger. Alternatively, the sleeve may be received within the collet and the collet may be located within the rod or plunger. The sleeve may be positioned to press against the collet to flex portions of the collet to grip the rod or plunger. Advantageously, the slots in the rigid collet make it flexible enough to allow for generous tolerances in the manufacturing thereof and allow the rigid collet to have thicker sidewalls, thus providing a higher rigidity in axial compression of the collet. Because the rigid collet is hardened, it is more resistant to surface wear than prior art work support sleeves and, if some surface wear is experienced, its flexibility allows it to absorb any resulting increased clearance between the collet and the plunger, while continuing to hold the plunger securely. Floating within the sleeve, the rigid collet advantageously fully contacts the plunger along its length and circumference, even at low pressures, due to the high flexibility of the collet provided by the slots.

Another embodiment of the invention is a clamping mechanism for a hydraulic work support system. The clamping mechanism may include a hollow, rigid collet, a rod or plunger, a sleeve, and a housing. The collet may have one or more sidewalls, a first open end, and a second open end, as well as a plurality of slots formed through the sidewalls. The slots may be sized and positioned to allow inward flexure of the collet. The rod or plunger may be received into or through the collet through the first open end and/or the second open end. The sleeve may substantially cover the collet to apply inward pressure to the collet, such that inward pressure applied to the sleeve causes the collet to flex inward, clamping onto the rod or plunger. The housing may assist in hydraulically actuating the rod or plunger between a first retracted position and a second extended position. The sleeve may be located between the collet and at least a portion of the housing. The housing may also include hydraulic fluid passageways that allow hydraulic fluid to be pumped into a space between the sleeve and the housing.

Another embodiment of the invention is a method of clamping a rod or plunger of a hydraulic work support system. The method may include the steps of pumping hydraulic fluid into an inlet of the hydraulic work support system and hydraulically actuating a plunger of the hydraulic work support system outward from a first retracted position to a second extended position via the hydraulic fluid. The method may also include a step of pumping the hydraulic fluid to an outer surface or an inner surface of a plastic sleeve surrounding or located within a hardened metal collet. The collet may have at least one sidewall with a plurality of slots formed therethrough, the slots being sized and positioned to allow inward flexure or outward flexure of the collet. The method may also include a step of pressing the sleeve radially inward or radially outward against the collet when a sufficient hydraulic pressure is applied to the plastic sleeve, thereby flexing portions of the collet radially inward or radially outward to grip an inner surface or an outer surface of the plunger, thus holding the plunger in the second extended position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
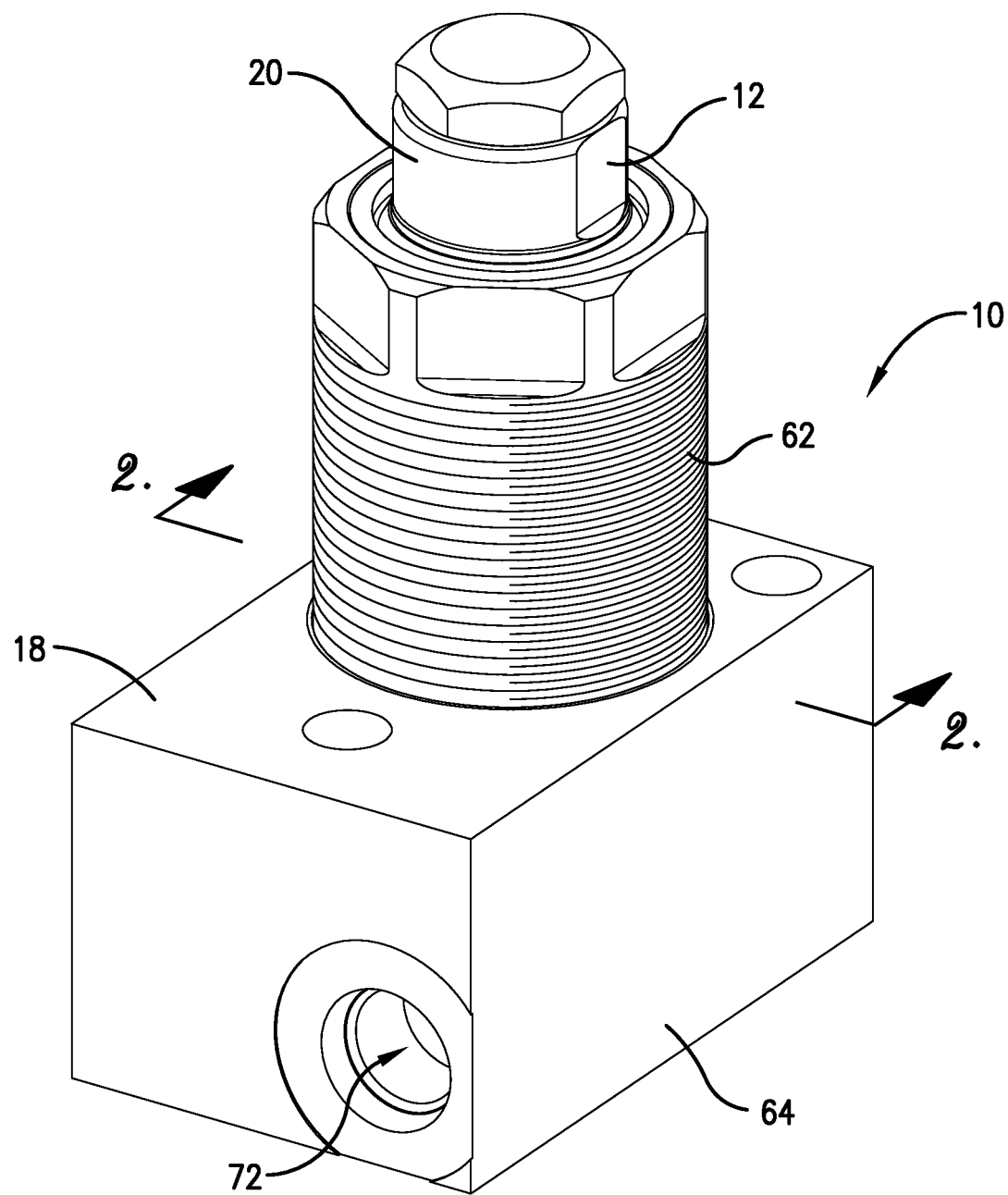
FIG. 1 is a perspective view of a work support constructed according to embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
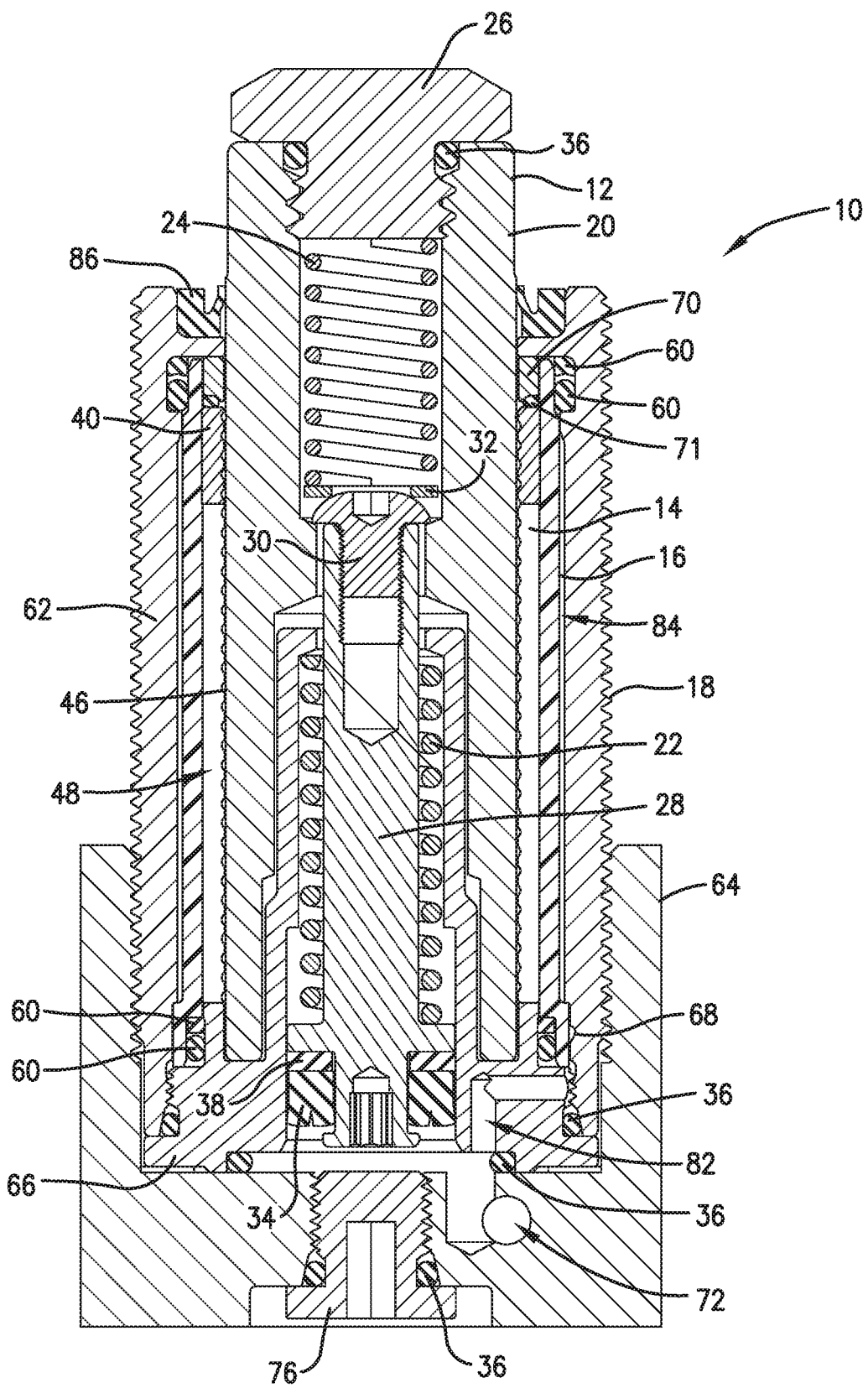
FIG. 2 is a cross-sectional elevation view of the work support of FIG. 1 with a plunger thereof in a first retracted configuration.
Figure 3:
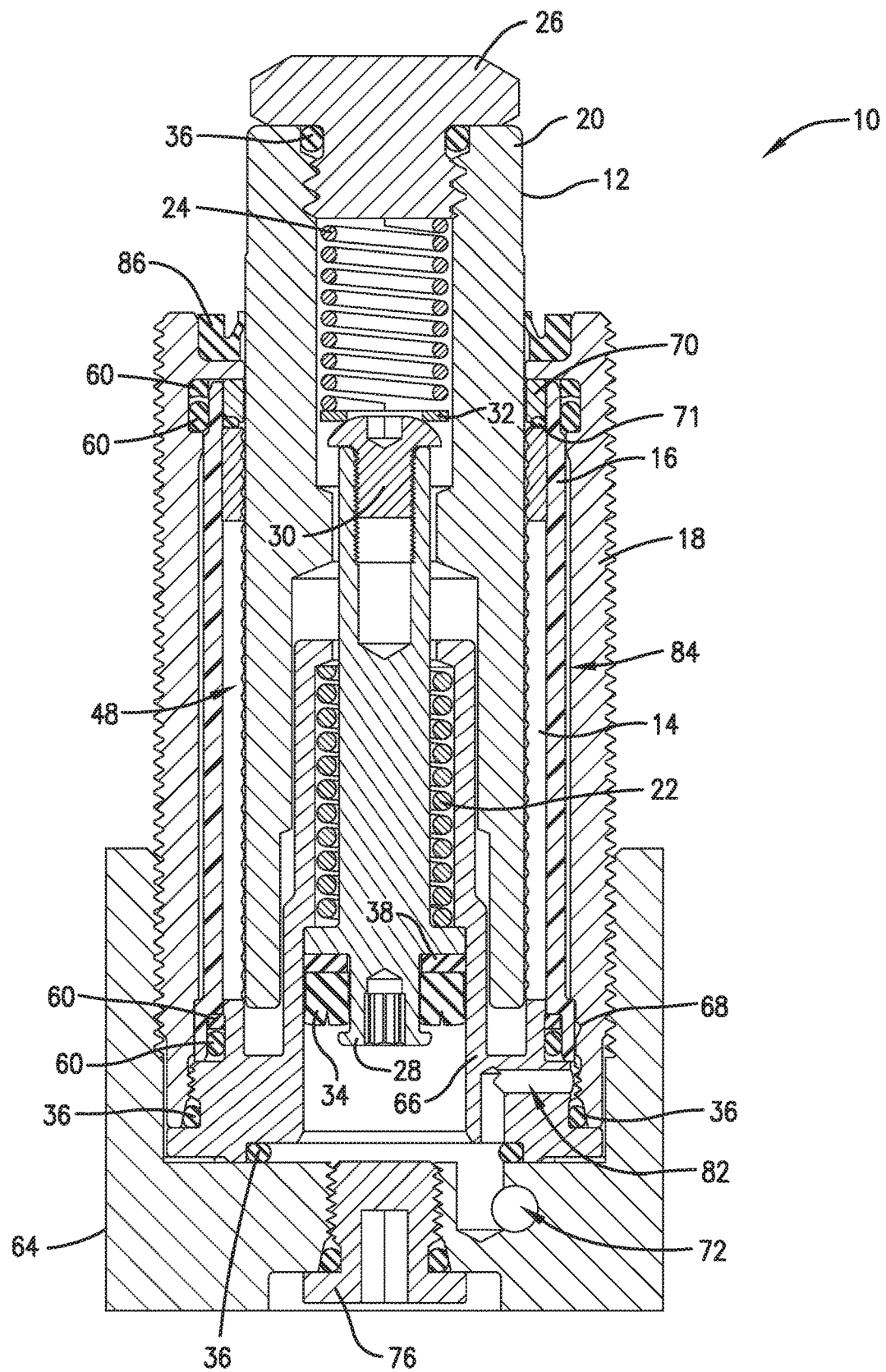
FIG. 3 is a cross-sectional elevation view of the work support of FIG. 1 with the plunger thereof in a second extended configuration.

A work support 10, constructed in accordance with embodiments of the present invention, is illustrated in FIGS. 1-3. The work support 10 may be a hydraulic work support or any work support configured for generally supporting a work piece on a fixture inside a computer numerical control (CNC) machine tool or the like. As illustrated in FIGS. 2 and 3, the work support 10 may be or may include a clamping mechanism comprising a plunger 12, a collet 14 placed around at least a portion of the plunger 12, and a sleeve 16 placed around at least a portion of the collet. When compressed, the sleeve 16 is configured to cause inward flexure of portions of the collet 14, closing a clearance between the collet 14 and the plunger 12, thus providing locking against axial or angular motion of the plunger 12. The work support 10 may further include and/or be insertable into a housing 18, as later described herein.

The plunger 12, as defined herein, may be any translatable component, such as a solid or hollow shaft or rod that is movable to slide or translate axially by spring, air, or hydraulic force for positioning with respect to a work piece (not shown). For example, embodiments of the invention illustrated herein are configured to actuate the plunger 12 by hydraulic pressure, such as oil pumped or released into the work support 10 and/or the housing 18 thereof. An outer surface of the plunger 12 may be generally smooth or manufactured to a specific roughness to increase coefficient of friction between the plunger 12 and the collet 14, and therefore increase load holding capacity. The plunger 12 may be fully contained in the sleeve 16 and the collet 14 or may be a rod that passes completely through the sleeve and collet and is movably positioned by some external means like an air cylinder, gear and pinion, mechanical linkage, or the like.

Figure 7:
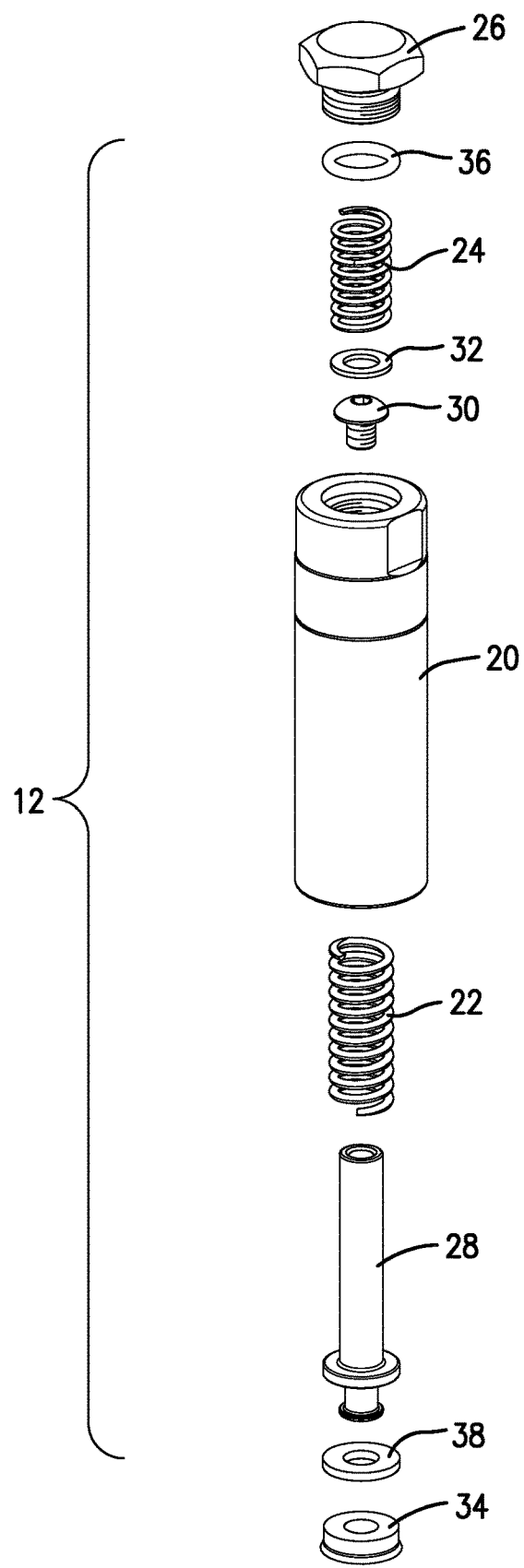
FIG. 7 is an exploded perspective view of the plunger of FIG. 2.

For example, as illustrated in FIGS. 2, 3, and 7, the plunger 12 may include a hollow shaft 20, a first spring 22, a second spring 24, a contact bolt 26, a piston 28, a piston bolt 30, and various mechanical linking or sealing devices such as one or more washers 32, seals 34, O-rings 36, backup rings 38, wipers 86, and the like. As illustrated in FIGS. 2-3, the first spring 22 and/or the second spring 24 may be biased and configured to maintain the piston 28, and therefore the plunger 12 as a whole, in a downward or retracted direction unless the piston 28 is otherwise pressed, via hydraulic fluid or the like, in an upward or extended position of the piston 28 and the plunger 12 as a whole. However, other hydraulic plunger configurations may be used without departing from the scope of the invention described herein.

Figure 8:
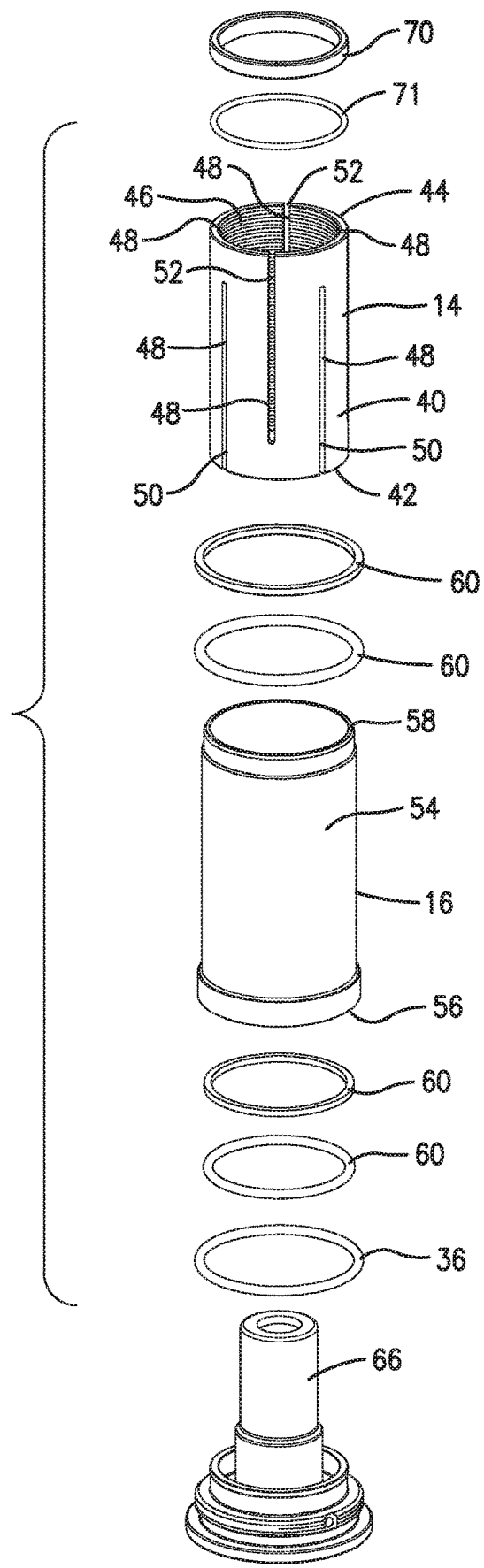
FIG. 8 is an exploded perspective view of the retaining device, a collet, and a sleeve of the work support of FIG. 1.

As illustrated in FIGS. 2, 3, and 8, the collet 14 may be a hollow tube of any cross-sectional shape having one or more sidewalls 40 extending between a first open end 42 and a second open end 44. The collet 14 may be, for example, a cylindrical tube. However, the cross-sectional shape formed by the sidewalls 40 may alternatively be square, rectangular, triangular, hexagonal, or any shape without departing from the scope of the invention. In a cylindrical configuration, the collet 14 may have a length, an inner diameter, an outer diameter, and a thickness defined by the inner diameter and the outer diameter. The collet 14 may be made of any rigid material known in the art. For example, the collet 14 may be made of a material such as steel, stainless steel, tool steel, spring steel, or the like, hardened into the spring temper range. Various surfaces of the sidewalls of the collet 14 may be generally smooth or manufactured to a specific roughness to, for example, increase coefficient of friction between the plunger 12 and the collet 14, and therefore increase load holding capacity. Specifically, as illustrated in FIGS. 2, 3, and 8, at least one surface of the sidewalls 40 facing the plunger 12 may have ribs 46 or screw threads formed thereon for assisting in gripping the plunger 12, as later described herein. Furthermore, these ribs, screw threads, and/or other grooves or protrusions provided on the sidewalls 40 may be configured to provide a relief for grit, oils, coolant, and the like to escape from between contacting surfaces of the plunger 12 and the collet 14.

As illustrated in FIG. 8, the collet 14 may have a plurality of slots 48 formed into and through the sidewalls 40 in a configuration designed for making the collet 14 a flexible member when squeezed from the outer diameter. These slots 48 may allow the collet 14 to be thicker, thus having an increased axial stiffness without increasing an amount of force required for closing on the plunger 12. For example, in some embodiments of the invention, the collet 14 may be made of stainless steel having a thickness in a range between 0.01 inches and 0.08 inches, or between 0.04 inches and 0.06 inches.

The slots 48 may be spaced apart at regular or non-regular intervals in a symmetric or non-symmetric configuration. The slots 48 may extend a full length or a partial length of the collet 14 and may start from either or both open ends 42, 44, or comprise multiple slots 48 along the length of the collet 14. For example, the slots 48 may extend from the first open end 42 and/or the second open end 44 along at least a portion of the length of the collet 14 in a vertical or angular orientation. That is, the slots 48 may be substantially vertical slots formed parallel to a center axis of the collet 14 (i.e., slots 48 extending perpendicularly from the first open end 42 and/or the second open end 44), or the slots 48 may be angular slots formed at non-perpendicular angles relative to the first open end 42 and/or the second open end 44. The slots 48 may be cut or otherwise formed to have any cross-sectional shape, such as square, round, or a combination of both, and may pass through the thickness of the collet 14 in a perpendicular or angular fashion.

In one embodiment of the invention, as illustrated in FIG. 8, the slots 48 in the collet 14 may include a plurality of axially-aligned first-end slots 50 and a plurality of axially-aligned second-end slots 52. The first-end slots 50 may be spaced apart from one another along the sidewall 40 and extend from the first end opening 42 for a portion of the length of the sidewall 40. The second-end slots 52 may also be spaced apart from one another along the sidewall 40 and extend from the second end opening 44 for a portion of the length of the sidewall 40. The first-end slots 50 may interdigitate or interlock with the second-end slots 52, such that each of the first end slots 50 is adjacent to at least one of the second end slots 52, as illustrated in FIG. 8.

Figure 12:
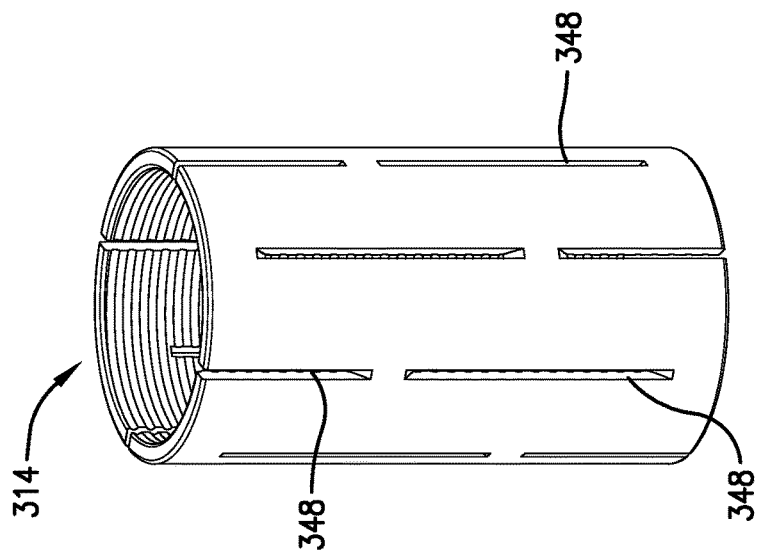
FIG. 12 is a perspective view of a third alternative embodiment of the collet of FIG. 8.
Figure 11:
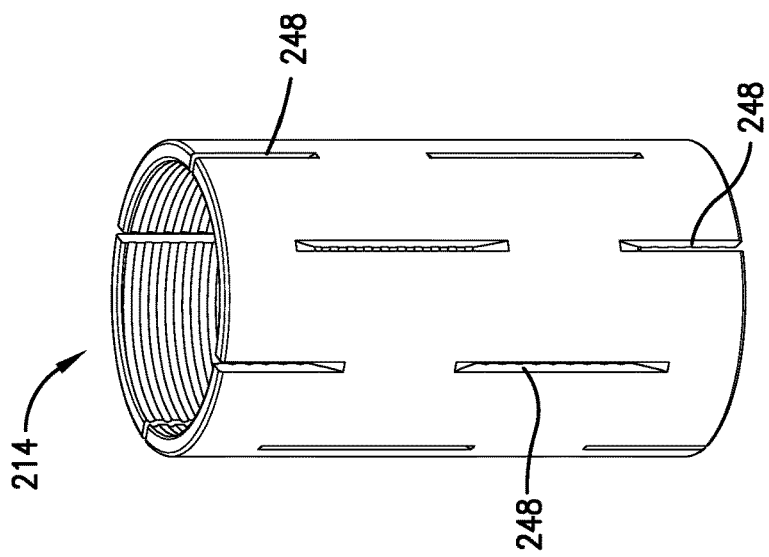
FIG. 11 is a perspective view of a second alternative embodiment of the collet of FIG. 8.
Figure 10:
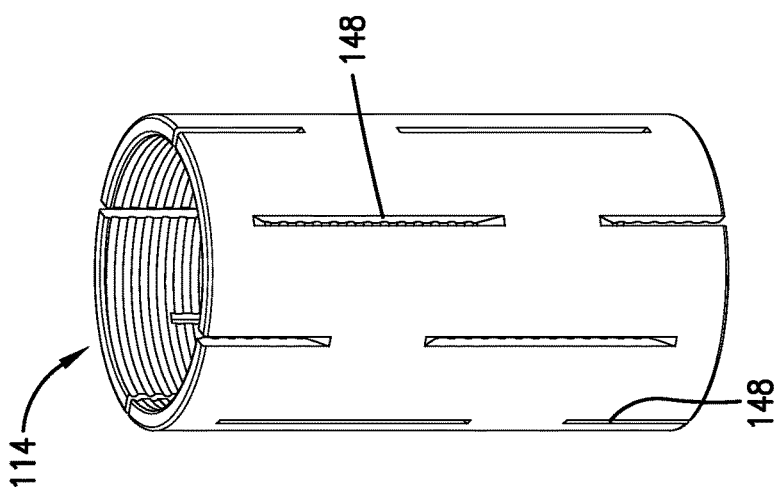
FIG. 10 is a perspective view of a first alternative embodiment of the collet of FIG. 8.

In other embodiments of the invention, the collet 14 may be replaced with a collet 114 with slots 148 formed therein and sized, spaced, and positioned as illustrated in FIG. 10. In yet another embodiment of the invention, the collet 14 may be replaced with a collet 214 with slots 248 formed therein and sized, spaced and positioned as illustrated in FIG. 11. In still another embodiment of the invention, the collet 14 may be replaced with a collet 314 with slots 348 formed therein and sized, spaced and positioned as illustrated in FIG. 12. The collet 114, the collet 214, and/or the collet 314 may include slots extending from end openings as well as slots which do not meet at either of the opposing end openings of the collet 114, the collet 214, and/or the collet 314. As illustrated in FIGS. 10-12, the spacing between the slots in any of these collets may vary, both circumferentially and length-wise.

The sleeve 16, as illustrated in FIGS. 2, 3, and 8, may be a hollow tube of plastic or other flexible, deformable material such as brass or copper. For example, the sleeve 16 may be substantially cylindrical. However, the sleeve 16 may have any cross-sectional shape without departing from the scope of the invention. The sleeve 16 may have sidewalls 54, a first open end 56, and a second open end 58. The sleeve 16 may also have a length, an inner diameter, and an outer diameter. The inner diameter may be sized slightly smaller than the collet's outer diameter in a relaxed state so as to cause a preloading of the collet 14 when the collet 14 is installed into the sleeve 16. The wall thickness of the sleeve 16 (i.e., the difference between the outer diameter and the inner diameter of the sleeve 16) may be designed to require a specific external hydraulic pressure to close a clearance between the collet 14 and the plunger 12.

The sleeve 16 may also comprise and/or be coupled to seals 60 configured for sealing the hydraulic pressure applied to the sleeve 16. In some embodiments of the invention, the seals 60 may be configured to trap hydraulic fluid between the sleeve 16 and portions of the housing 18, and/or to otherwise create a hydraulic seal configured for maintaining the hydraulic pressure applied to the sleeve 16 and the collet 14. The seals 60 may comprise, for example, flexible O-rings, back up rings, and/or other sealing mechanisms or devices known in the art. For example, O-rings may be positioned on the inner diameter or the outer diameter of the sleeve 16 at either one of the first and second open ends of the sleeve 16.

The housing 18 may be part of a cartridge or base-mounted work support commonly used in hydraulic fixturing, or may be formed into a frame of a machine, such as the CNC machine noted above. In some embodiments of the invention, the housing 18 may comprise a first hollow body 62, a base 64, and/or a retaining device 66, as illustrated in FIGS. 1-3 and FIGS. 8-9. The base 64 may house a portion of the first hollow body 62, and the retaining device 66 may be located within the first hollow body 62 and the base 64.

Figure 3A:
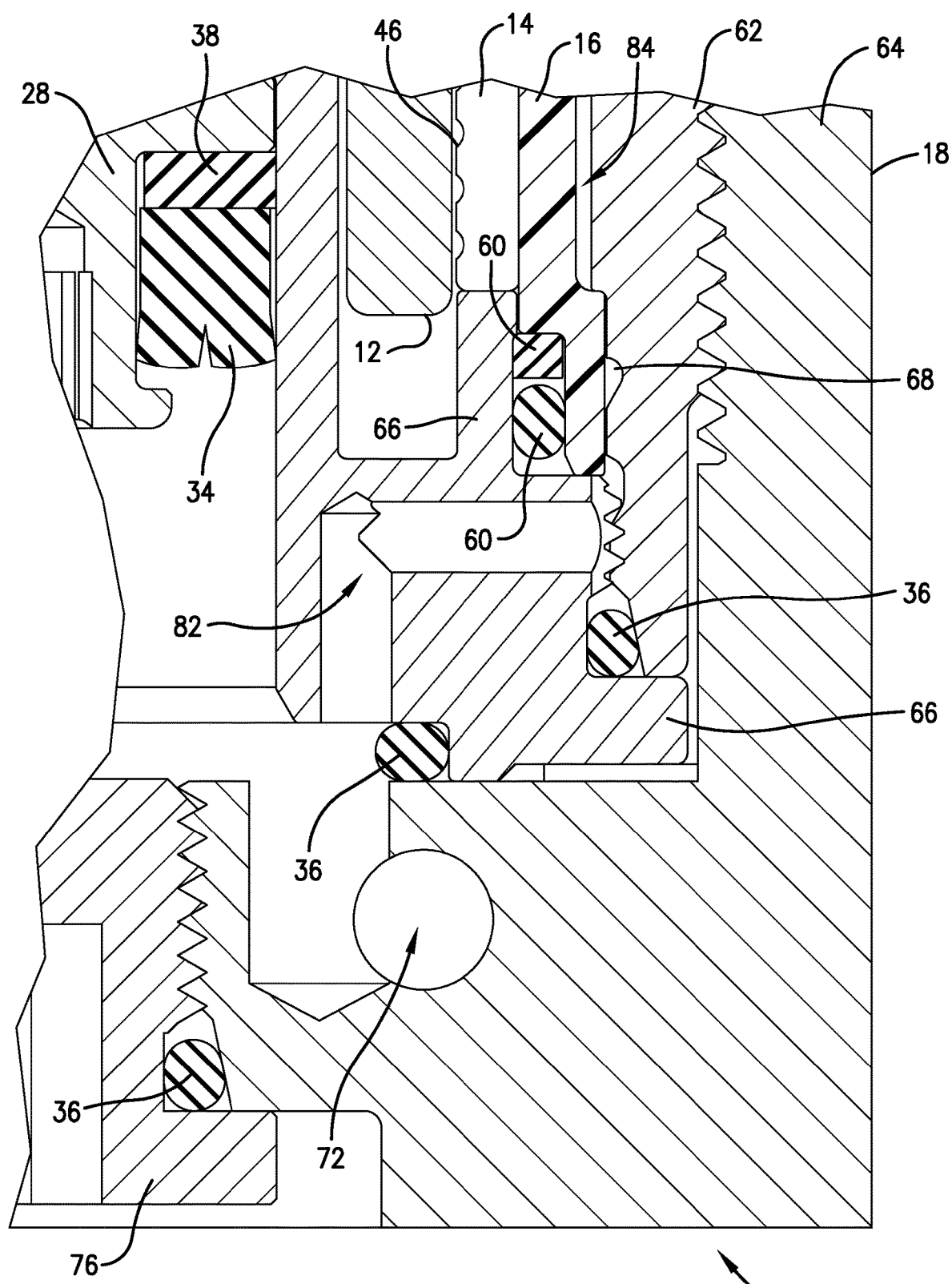
FIG. 3a is an enlarged fragmentary cross-sectional elevation view of the work support of FIG. 3, illustrating hydraulic passageways formed therethrough.

The first hollow body 62 may have one or more sidewalls with an outer surface and an inner surface extending between a first end opening and a second end opening. As illustrated in FIG. 3a, the inner surface of the first hollow body 62 may include channels 68, grooves, and/or passages formed therein for passing hydraulic fluid therethrough. For example, the inner surface of the first hollow body 62 may have a helical channel 68 formed therein, proximate to the first end opening of the first hollow body 62. Additionally or alternatively, the inner surface of the first hollow body 62 may include various indents, protrusions, shoulders, or the like for limiting motion of the plunger 12 and/or properly locating or positioning various other components of the work support 10 therein. In some embodiments of the invention, the first hollow body 62 may further comprise and/or mate with a preload ring 70 at the second end opening of the first hollow body 62, as illustrated in FIGS. 2 and 3, while the retaining device 66 may be inserted into and/or at the first end opening of the first hollow body 62. The first hollow body 62 may further house a preload O-ring 71 positioned adjacent to the preload ring 70. In one embodiment, the preload O-ring 71 is positioned between the preload ring 70 and the collet 14. The preload ring 70 may be contoured so as to bias the preload O-ring away from the plunger 12.

Figure 4:
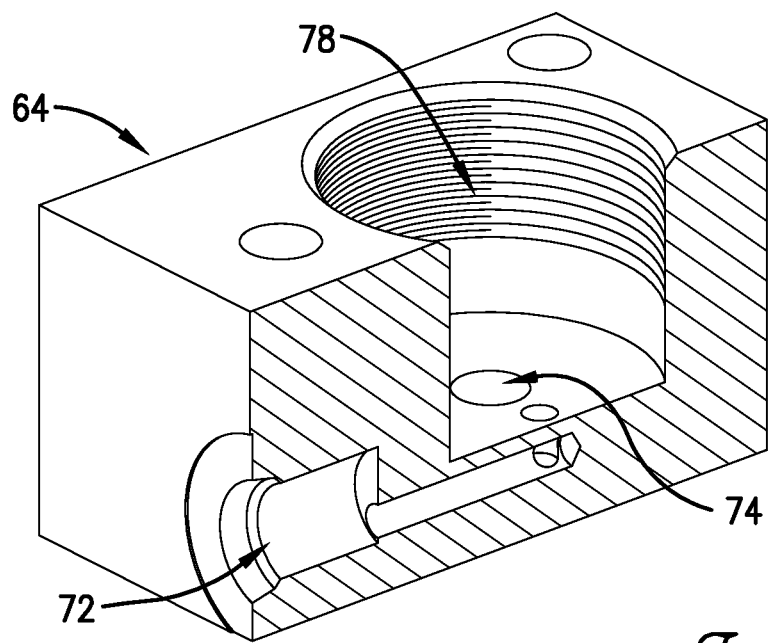
FIG. 4 is a top sectioned perspective view of a base of the work support of FIG. 1.
Figure 5:
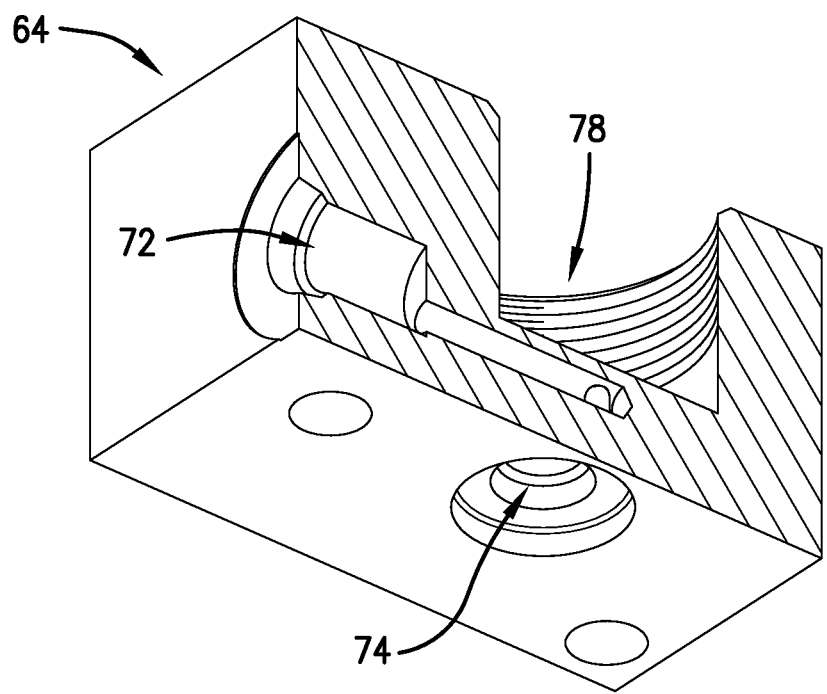
FIG. 5 is a bottom sectioned perspective view of the base of FIG. 4.

The base 64 may include one or more inlets, outlets, or openings formed therethrough and configured for delivering oil or other hydraulic fluids to the first hollow body 62, the retaining device 66, and/or the plunger 12. For example, as illustrated in FIGS. 4 and 5, the base 64 may include a first hydraulic fluid port 72 and/or a second hydraulic fluid port 74. In some embodiments of the invention, either of the first hydraulic fluid port and the second hydraulic fluid port may comprise a plug 76 sized and located therein to seal the first hydraulic fluid port 72 and/or the second hydraulic fluid port 74, as illustrated in FIGS. 2 and 3. However, a single hydraulic fluid port or any plurality of hydraulic fluid ports may be formed into the base without departing from the scope of the invention. The base 64 may also include a cavity 78 sized and configured such that the retaining device 66 and/or the first hollow body 62 may be inserted therein. For example, the first hollow body 62 may be screwed into the cavity 78 via screw threads, as illustrated, or may be fixed within the cavity as illustrated in FIGS. 2-3 using any fastening devices and techniques known in the art. The cavity 78 may also be fluidly connected to the inlets, outlets, or openings of the base, such that hydraulic fluid may be provided thereto, as illustrated in FIGS. 4 and 5.

The retaining device 66 may have one or more sidewalls extending between a first end opening and a second end opening, thereby forming a hollow rigid tube or cylinder configured for housing elements of the plunger 12 and/or hydraulic fluid. For example, the first spring 22 and/or the piston 28 of the plunger 12 may be housed within the retaining device 66, and the retaining device 66 may be positioned within the hollow shaft 20 of the plunger 12. In some embodiments of the invention, the retaining device 66 may be hydraulically sealed to the sleeve 16 or one end thereof, the base 18 and/or the first hollow body 62 using any of the seals 34, O-rings 36, and/or backup rings 38 described above, as well as a gasket 80 and/or other mechanical devices known in the art, as illustrated in FIGS. 2, 3, 8, and/or 9. The retaining device 66 may be fixed relative to the first hollow body 62 and/or the base 64, with the first end opening of the retaining device 66 substantially aligned with or fluidly coupled to one or more of the inlets, outlets, or openings of the base 64, such that hydraulic fluid may flow through the base 64, into the retaining device 66, and thereby push the piston 28 and compress the first spring 22.

Figure 6:
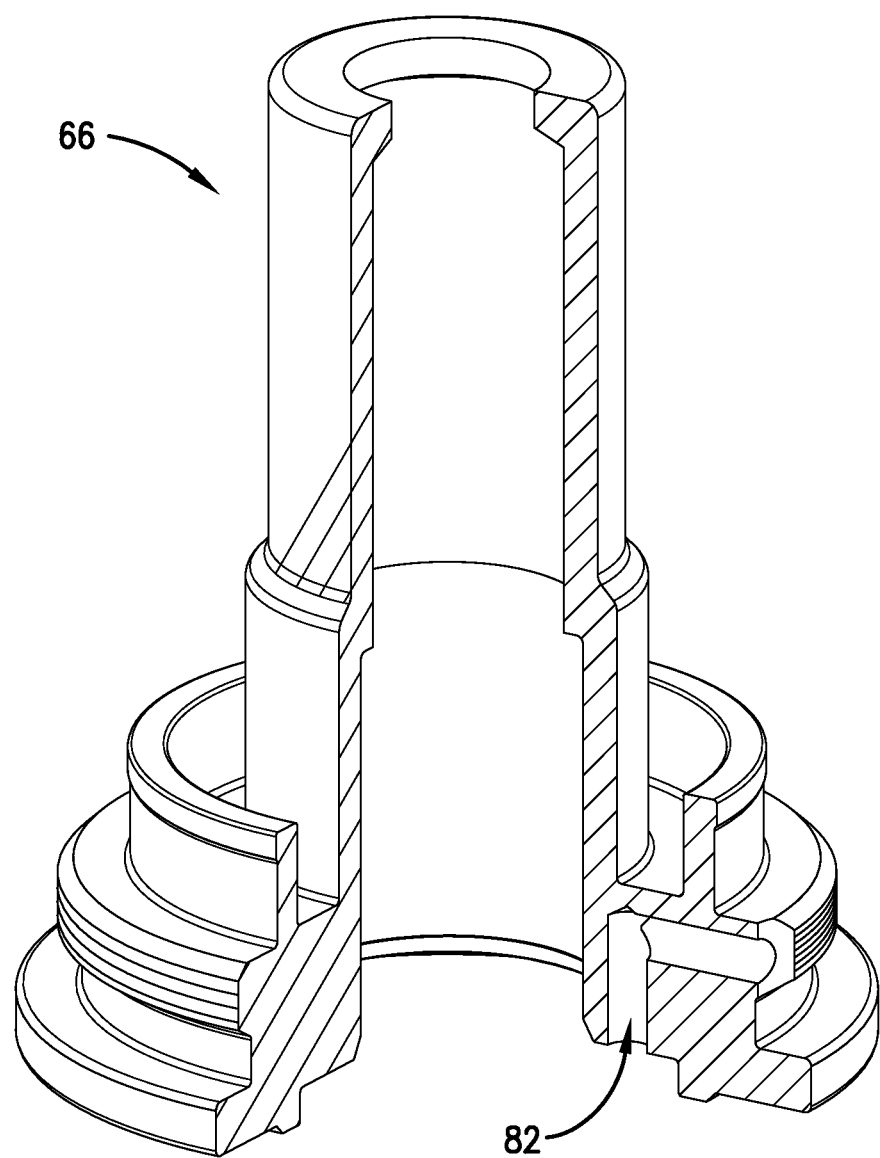
FIG. 6 is a sectioned perspective view of a retaining device of the work support of FIG. 1.

In some embodiments of the invention, one or more hydraulic passageways 82 may be formed into one or more of the sidewalls of the retaining device 66, as illustrated in FIGS. 3a and 6, allowing hydraulic fluid to pass from within the retaining device 66 out to a space 84 provided between the sleeve 16 and the first hollow body 62, as illustrated in FIG. 3a. Specifically, the hydraulic passageways 82 of the retaining device 66 may be fluidly coupled with the channels 68 formed in the inner surface of the first hollow body 62. Once a certain amount of hydraulic fluid at a certain pressure passes into a space 84 between the first hollow body 62 and the sleeve 16, as illustrated in FIGS. 2 and 3, the sleeve 16 may flex or compress inward, thereby pressing against the collet 14 and closing the clearance between the collet 14 and the plunger 12.

Figure 9:
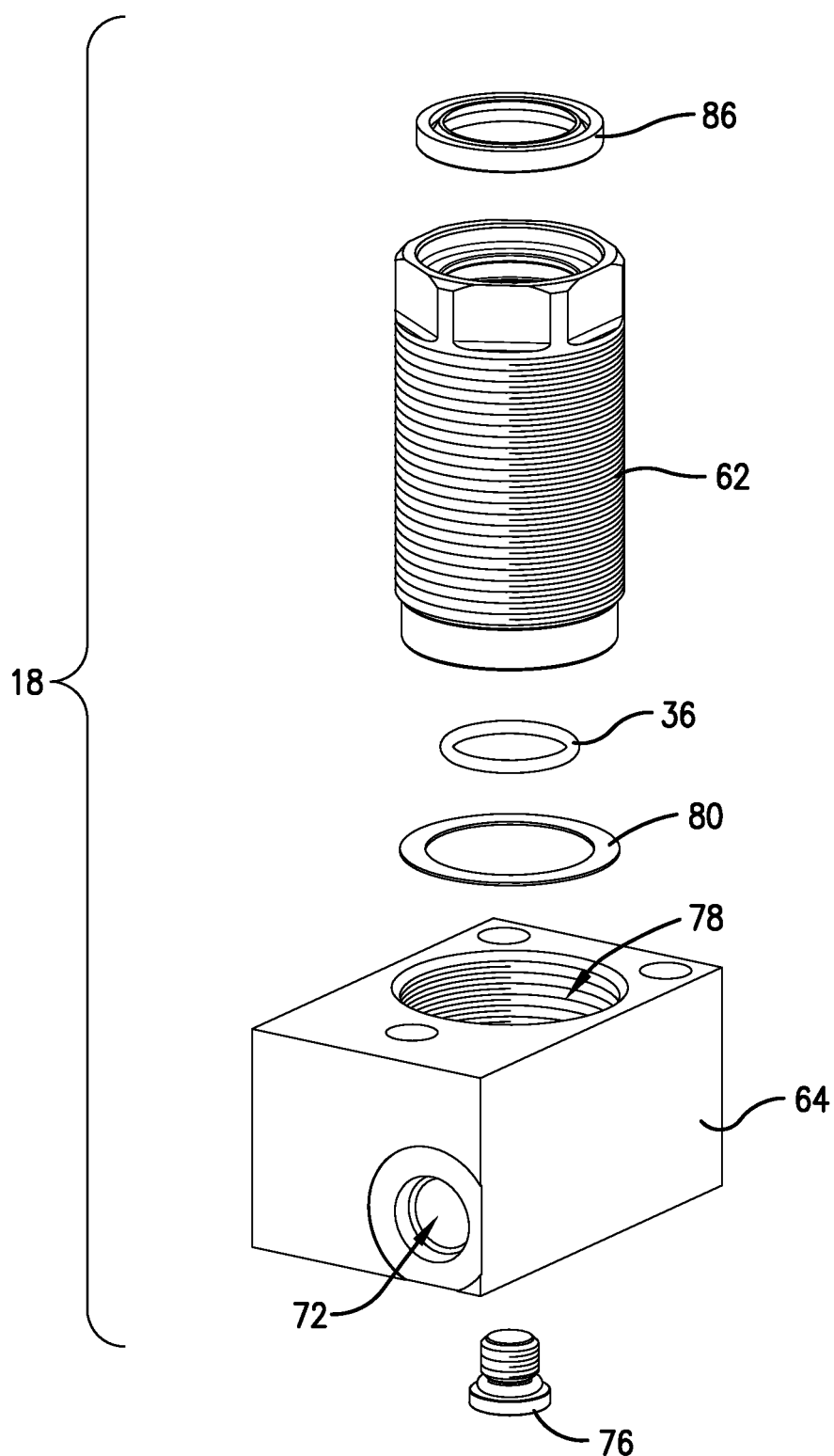
FIG. 9 is an exploded perspective view of various housing components of the work support of FIG. 1.

The various work support 10 components described herein are merely exemplary and may be replaced with a number of other functional alternatives without departing from the scope of the invention. For example, various O-rings, gaskets, back up rings, seals, wipers, and the like are illustrated in FIGS. 7-9 and may provide desired sealing between components to limit where the hydraulic fluid flows within the work support 10. However, these elements may be replaced with other seals, vulcanized rubber, friction welding, integrated features, or the like, or may be omitted entirely without departing from the scope of the invention.

Furthermore, the collet 14 described herein may be flexed by the sleeve 16 via any method known in the art, including induced pressure differentials (e.g., using an air pump or vacuum), hydraulic pressure as shown (e.g., using oil, water, or other hydraulic fluids), or any other method of compressing the sleeve 16 to flex the collet 14 for closing the clearance between the collet 14 and the plunger 12. Furthermore, the collet 14 and the sleeve 16 may be designed for clamping or gripping any rod without departing from the scope of the invention.

In use, the work support 10 described herein may be provided with external force to press the sleeve's sidewalls 54 against the collet's sidewalls 40, thereby flexing portions of the collet 14 and closing the clearance between the collet 14 and the plunger 12 or any rod placed therein. The seals 60 on either end of the sleeve 16 may retain hydraulic fluid between the first hollow body 62 of the housing 18 and the sleeve 16 until such time as the plunger 12 or the rod are to be released by the collet 14.

Figure 13:
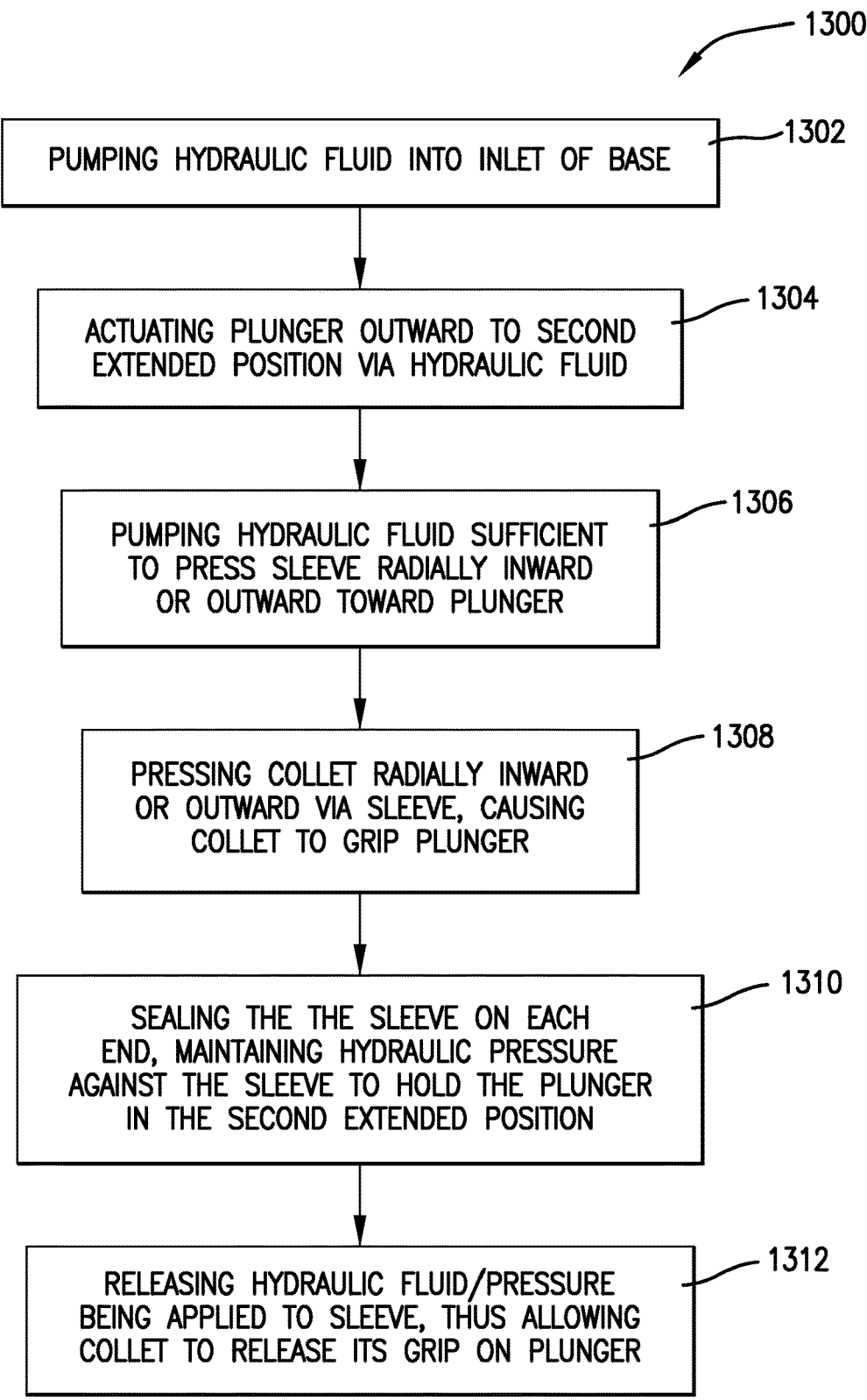
FIG. 13 is a flow chart illustrating a method of hydraulically gripping and holding a plunger of a work support in place in accordance with embodiments of the present invention.

Method steps for clamping the plunger 12 of the work support 10 with the collet 14 will now be described in more detail, in accordance with various embodiments of the present invention. The steps of the method 1300 may be performed in the order as shown in FIG. 13, or they may be performed in a different order. Furthermore, some steps may be performed concurrently as opposed to sequentially. In addition, some steps may not be performed.

As illustrated in FIG. 13, the method 1300 may include the steps of pumping hydraulic fluid, such as oil, into one of the inlets or hydraulic fluid ports 72,74 of the base 64, as depicted in block 1302, thus causing a next step of actuating the plunger 12 outward via the hydraulic fluid flowing into the retaining device 66, which presses the piston 28 out to an extended position or configuration, as depicted in block 1304 and in FIG. 3. The piston 28 may move the piston bolt 30, the washer 32 adjacent thereto, and the spring 24, which acts on the hollow shaft 20 of the plunger 12 through the contact bolt 26. For example, a pressure of approximately 80 PSI may overcome the first spring 22 force enough to begin pressing the piston 28 outward, with a pressure of approximately 160 PSI fully extending the piston 28, unless the contact bolt 26 first contacts a work piece, limiting full extension of the plunger 12. Note that in the configuration illustrated in FIGS. 2 and 3, when hydraulic pressure is applied to piston 28, the piston 28 may shoulder in retaining device 66 (i.e., a full stroke length of the piston 28) while the hollow shaft 20 of the plunger 12 may only extend out until it contacts the work piece.

Next, the method 1300 may include a step of pumping hydraulic fluid sufficient to press the sleeve 16 inward or in a direction toward the collet 14, as depicted in block 1306. Specifically, once the pressure within the retaining device 66 is sufficiently high and the piston 28 cannot be extended further, hydraulic fluid may then flow through the passageways 82 of the retaining device, through channels 68 or passageways formed into the inner surface of the first hollow body 62, and up into the space 84 between the sleeve 16 and the first hollow body 62, as illustrated in FIGS. 3 and 3a. Once a sufficient pressure is provided in this space 84, such as approximately 300 PSI to 750 PSI, the sleeve 16 may begin to press inward toward and against the collet 14.

Then the method 1300 may include a step of pressing the sleeve 16 and thus pressing the collet 14 by a force or pressure sufficient to flex the collet 14 inward or toward the plunger, closing the clearance between the collet 14 and the plunger 12 or rod, as depicted in block 1308. Specifically, portions of the sidewalls 40 of the collet 14 between the slots 48 may flex when the collet 14 is squeezed at its outer diameter. This flexure may be sufficient to merely close the clearance between the collet 14 and the plunger 12 or rod, without significantly deforming the collet 14, such that the collet 14 may flex outward and release the plunger 12 or rod once the hydraulic pressure is drained from the space 84 between the first hollow body 62 and the sleeve 16.

In some embodiments of the invention, the method 1300 may further include a step of sealing the sleeve 16 on each end, as depicted in block 1310, maintaining hydraulic pressure against the sleeve 16 to hold the plunger 12 in the second extended position via the collet 14, as described above. Finally, the method 1300 may include a step of draining hydraulic fluid from within the housing 18, as depicted in block 1312, thus releasing the pressure on the sleeve 16 and allowing the collet 14 to flex back outward or otherwise flex back to its natural state, releasing its grip on the plunger 12 or rod.

Alternative Embodiment

Figure 14:
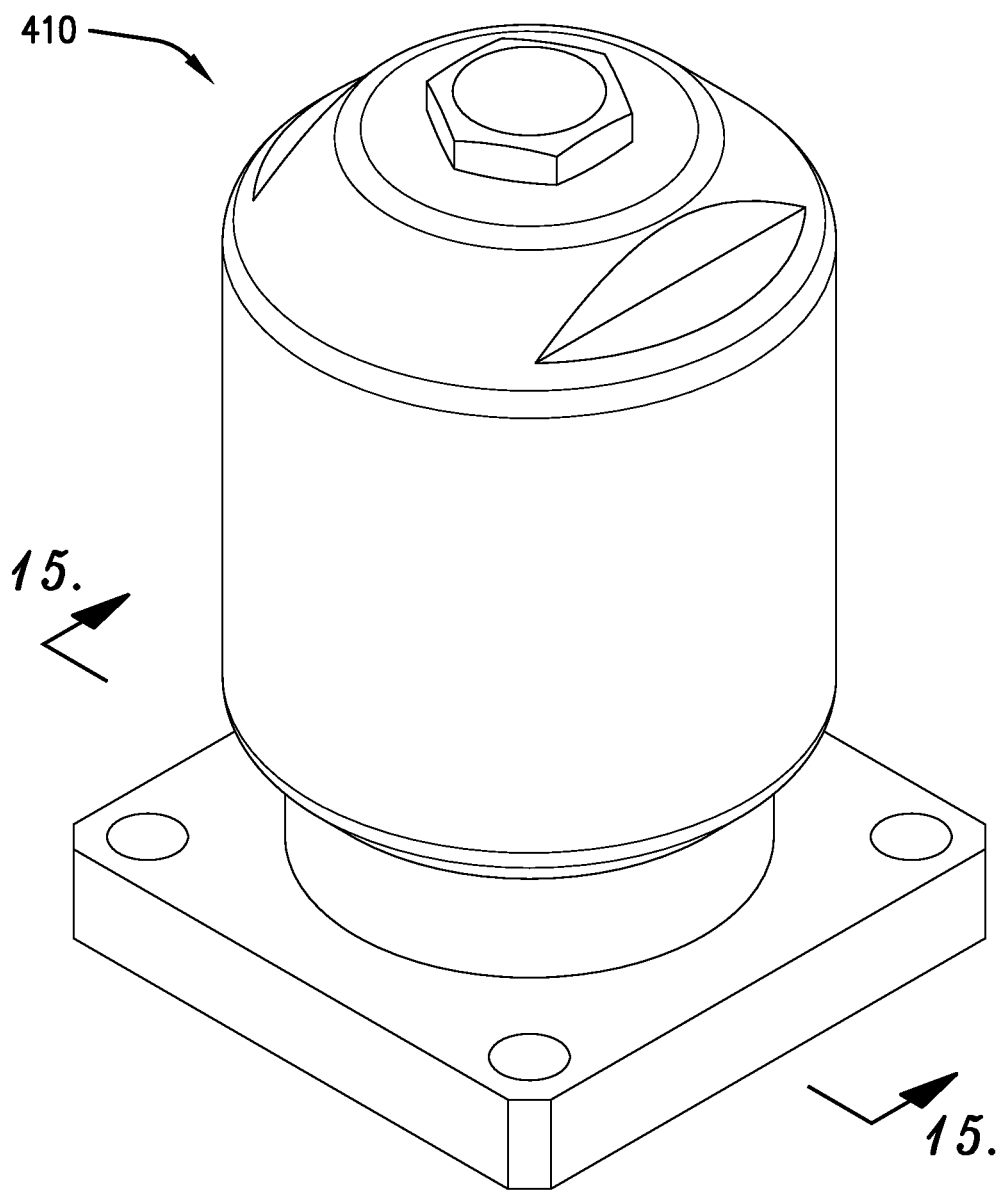
FIG. 14 is a perspective view of a work support constructed according to an alternative embodiment of the present invention.
Figure 15:
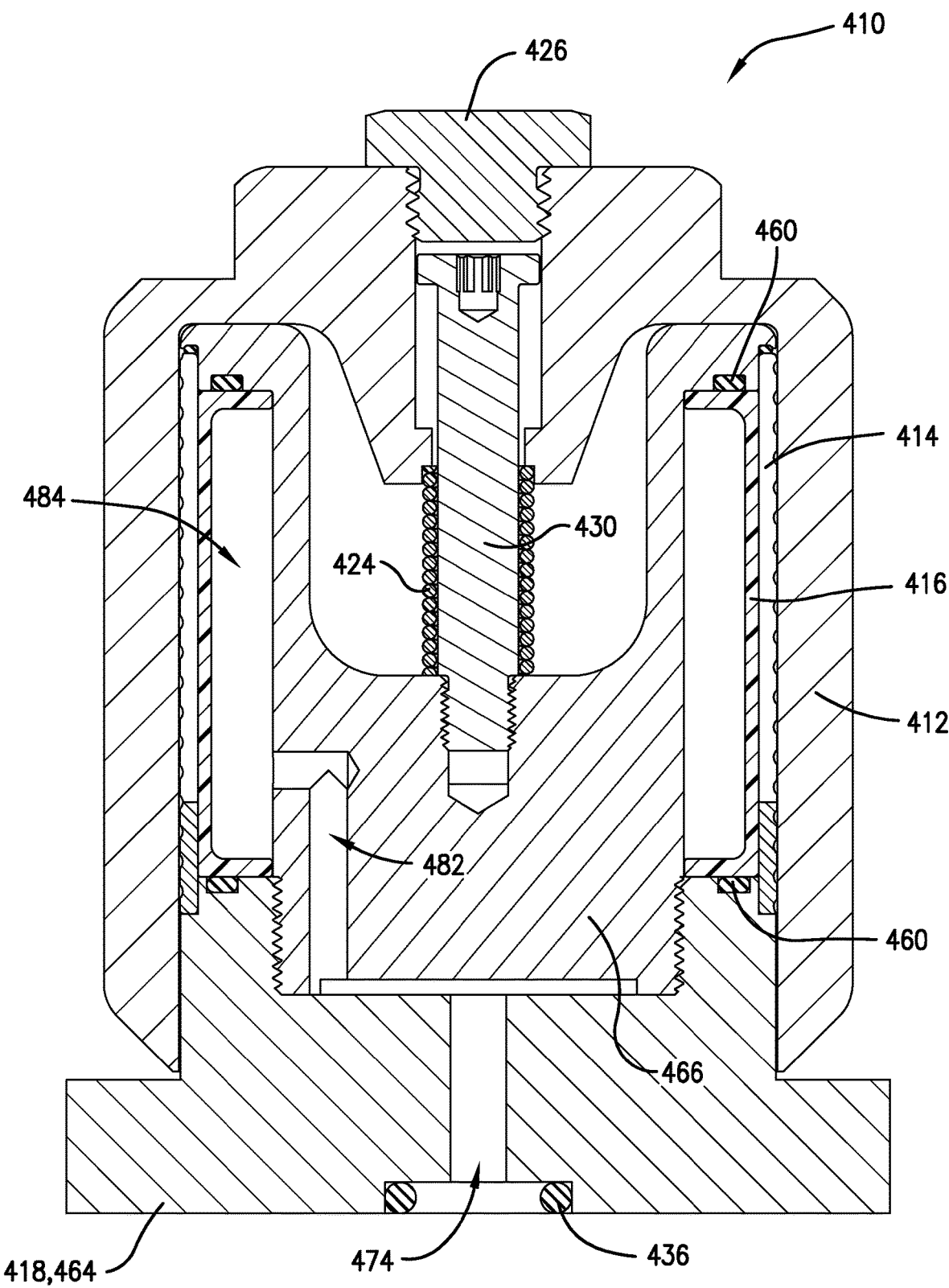
FIG. 15 is a cross-sectional elevation view of the work support of FIG. 14 with a plunger thereof in a retracted configuration.
Figure 16:
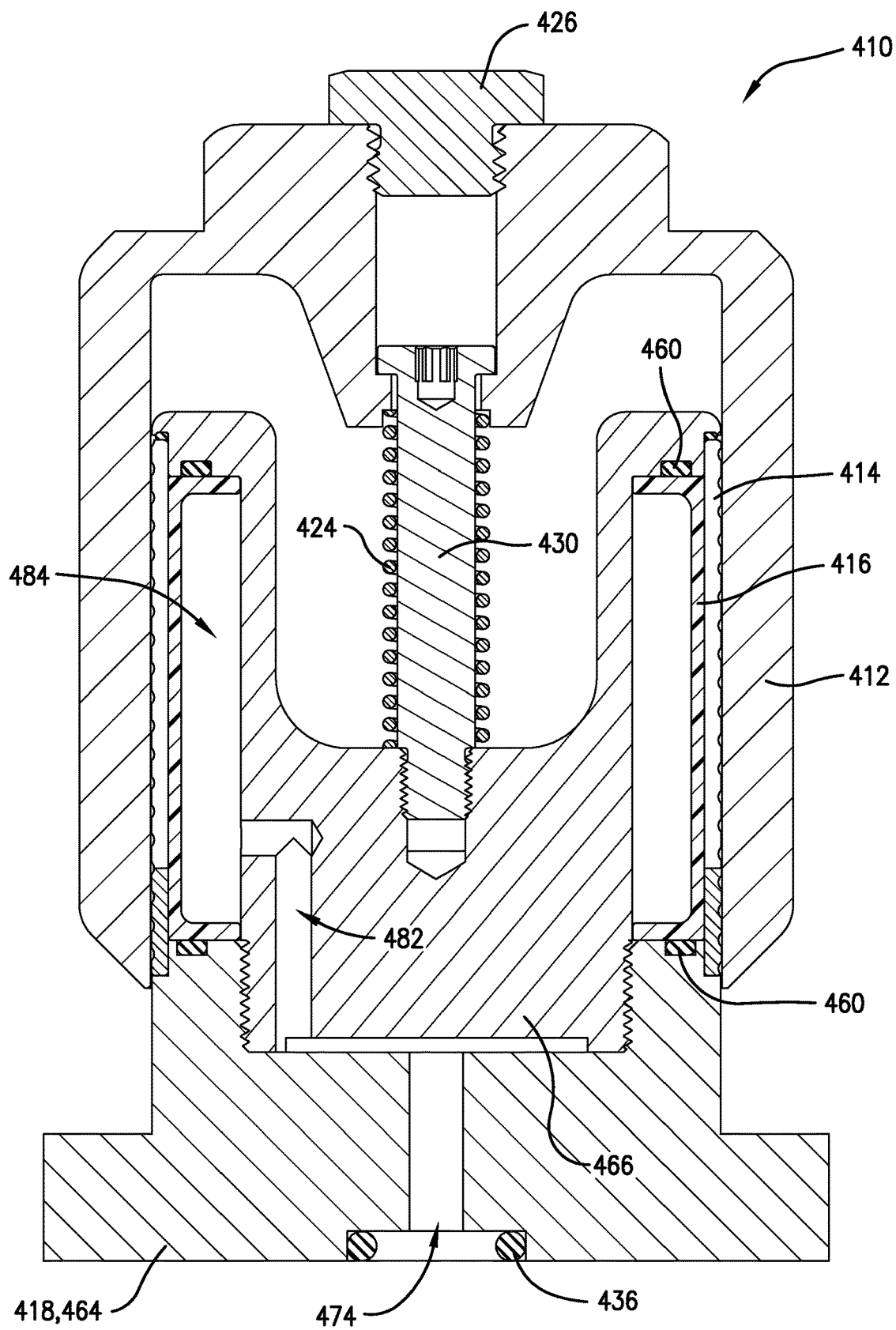
FIG. 16 is a cross-sectional elevation view of the work support of FIG. 14 with the plunger thereof in an extended configuration.

In one alternative embodiment of the invention, as illustrated in FIGS. 14-16, a work support 410 is provided with a hollow plunger 412, a slotted collet 414 resting within the hollow plunger 412, and a sleeve 416 located within the slotted collet 414. The hollow plunger 412, slotted collet 414, and the sleeve 416 may have many of the same attributes of the plunger 12, the collet 14, and the sleeve 16 described above. However, instead of the sleeve 416 pressing the collet 416 inward, the sleeve 416 may be configured to be pressed from the inside in a generally outward direction, flexing the slotted collet 414 outward to grip the hollow plunger 412.

The work support 410 may also include seals 460 which seal opposing ends of the sleeve 416 to a retaining device 466 and/or a base 464 of a housing 418 of the work support 410, as illustrated in FIGS. 15-16. Furthermore, a space 484 between a retaining device 466 and the sleeve 416 may be fluidly coupled with passageways 482, which may be coupled to hydraulic fluid port 474, as illustrated in FIGS. 15 and 16. Retaining bolt 430, centered within the plunger 412, functions substantially identical or similar to piston 28 and/or retaining bolt 30. In general, all reference numerals provided in FIGS. 14-16 correspond with the same number in FIGS. 1-12, without the leading "4." For example, spring 424 illustrated in FIGS. 15 and 16 is substantially identical or similar to spring 24 in FIGS. 2-3.

In use, pressure on a contact bolt 426 may compress the spring 424, moving the plunger 412 from an extended configuration, as in FIG. 16, to a retracted configuration as illustrated in FIG. 15. In this embodiment of the invention, the plunger 412 may be normally naturally-biased to rest in the extended configuration. Once the plunger 412 is pressed or otherwise actuated into a desired position, hydraulic fluid may be provided through the hydraulic fluid port 474 and fed to the space 484 to hydraulically press the sleeve 416 outward against the collet 414, which locks the plunger 412 in the desired position. Note that the desired position in this embodiment of the invention may be the plunger 412 being completely retracted, as illustrated in FIG. 15, or located in a position somewhere between the positions of the plunger 412 illustrated in FIGS. 15 and 16. For example, typically the state of the plunger 412 when supporting a work piece is in a mid-stroke position between the fully extended configuration and the retracted configuration.

Although the invention has been described with reference to the embodiments illustrated in the attached drawing figures, it is noted that equivalents may be employed and substitutions made herein without departing from the scope of the invention as recited in the claims. For example, although the invention is described herein for use in a work support, the hydraulically activated clamping of a translatable member (e.g., the plunger described herein) using the sleeve and collet configurations described herein may also be applied to any hydraulic holding devices, clamps, or the like for locking the translatable member in fixed relation thereto without departing from the scope of the invention. Furthermore, although hydraulic work supports are primarily described herein, note that the work support 10 could be replaced with work supports actuated or advanced via spring or air force, or any other methods known in the art. For example, 410 uses spring force only, without any hydraulic fluid required to extend and/or retract the plunger 412 or its associated components. In other embodiments of the invention, the plunger and/or piston may be normally retracted, but advanced or extended out under air pressure.

Having thus described various embodiments of the invention, what is claimed as new and desired to be protected by Letters Patent includes the following:

1. A clamping mechanism for a holding device, the clamping mechanism comprising:
   a retaining device;
   a hollow body having opposing first and second ends, the hollow body including retention structure near the second end, the retaining device and the retention structure cooperatively defining a sleeve region having a longitudinal length;
   a translatable component at least partially positioned in the hollow body;
   a hollow, rigid collet surrounding the translatable component such that the translatable component is hydraulically axially translatable relative to the collet, the collet having one or more sidewalls, a first open end, and a second open end, the collet having a plurality of slots formed through the one or more sidewalls, wherein the slots are circumferentially spaced around the one or more sidewalls of the collet and are vertically or angularly extending from at least one of the first open end, the second open end, and a point between the first open end and the second open end, the collet having a longitudinal length, the one or more sidewalk having a cylindrical outer surface the entirety of which is parallel to a central axis of the collet and an inner surface including a plurality of grooves for providing debris relief;
   a hollow sleeve positioned in the sleeve region and covering the collet, the sleeve having a first end and a second end opposite the first end of the sleeve, wherein the sleeve is radially flexible and configured to be radially actuated to press against the one or more sidewalls of the collet with sufficient force to flex portions of the collet to grip the translatable component, the sleeve having a longitudinal length less than the longitudinal length of the sleeve region;
   a first seal contacting the sleeve near the first end of the sleeve;

a second seal contacting the sleeve near the second end of the sleeve, a distance between the first seal and the second seal being equal or greater than the longitudinal length of the collet;

a preload ring positioned near the second open end of the collet; and a preload O-ring positioned adjacent to the preload ring.

2. The clamping mechanism of claim 1, wherein the slots are sized and positioned to allow inward flexure of the collet, and the sleeve is configured to apply inward pressure to the collet such that the inward pressure applied to the sleeve causes the collet to flex inward without significantly deforming the collet, clamping onto the translatable component.

3. The clamping mechanism of claim 1, wherein the sleeve is made of plastics, composites, aluminums, brass, copper, or any elastic material and the collet is made of at least one of steel, stainless steel, alloy steels, and hardened steel.

4. The clamping mechanism of claim 1, wherein a first set of slots each extend from the first open end partially along a length of the one or more sidewalls, wherein a second set of slots each extend from the second open end partially along a length of the one or more sidewalls.

5. The clamping mechanism of claim 4, wherein the first set of slots interlocks with the second set of slots, such that each slot of the first set of slots is adjacent to at least one slot of the second set of slots.

6. The clamping mechanism of claim 1, the hollow body forming at least a portion of a housing having at least one hydraulic fluid port configured to hydraulically actuate the translatable component between a first retracted position and a second extended position when hydraulic fluid is forced into or drained out of the at least one hydraulic fluid port.

7. The clamping mechanism of claim 6, wherein the sleeve is located between the collet and at least a portion of the housing, wherein there is a space between the sleeve and the housing, wherein the housing comprises hydraulic fluid passageways fluidly coupling the at least one hydraulic fluid port with the space between the sleeve and the housing, such that the hydraulic fluid pumped into the at least one hydraulic fluid port passes into the space between the sleeve and the housing, thereby pressing the sleeve against the collet under hydraulic pressure.

8. A clamping mechanism for a holding device, the clamping mechanism comprising:

a translatable component;

a hollow, rigid collet surrounding the translatable component such that the translatable component is hydraulically axially translatable relative to the collet, the collet having one or more sidewalls, a first open end, and a second open end, the collet having a plurality of slots formed through the one or more sidewalls, wherein the slots are circumferentially spaced around the one or more sidewalls of the collet and are vertically or angularly extending from at least one of the first open end, the second open end, and a point between the first open end and the second open end;

a hollow sleeve covering the collet, the sleeve having a first end and a second end opposite the first end, wherein the sleeve is radially flexible and configured to be radially actuated to press against the one or more sidewalls of the collet with sufficient force to flex portions of the collet to grip the translatable component;

a preload ring positioned near and spaced from the second open end of the collet, the preload ring further being positioned between the hollow sleeve and the translatable component; and a preload O-ring positioned between the preload ring and the collet, the preload ring having a contoured portion contacting the preload O-ring so that the preload O-ring is biased away from the translatable component.

9. The clamping mechanism of claim 8, the collet having an outer diameter, the preload ring having an outer diameter equal or slightly greater than the outer diameter of the collet.

10. The clamping mechanism of claim 8, the collet having an outer diameter, the preload O-ring having an outer diameter equal or slightly greater than the outer diameter of the collet when the preload O-ring is positioned near the second open end of the collet.

11. A clamping mechanism for a holding device, the clamping mechanism comprising:

a translatable component;

a hollow, rigid collet surrounding the translatable component such that the translatable component is hydraulically axially translatable relative to the collet, the collet having one or more sidewalls, a first open end, and a second open end, the collet having a plurality of slots formed through the one or more sidewalls, wherein the slots are circumferentially spaced around the one or more sidewalls of the collet and are vertically or angularly extending from at least one of the first open end, the second open end, and a point between the first open end and the second open end, the collet having a longitudinal length;

a hollow sleeve covering the collet, the sleeve having a first end and a second end opposite the first end, wherein the sleeve is radially flexible and configured to be radially actuated to press against the one or more sidewalls of the collet with sufficient force to flex portions of the collet to grip the translatable component;

a first seal positioned near the first end of the sleeve; and a second seal positioned near the second end of the sleeve, a distance between the first seal and the second seal being equal or greater than the longitudinal length of the collet, the first end of the sleeve encircling the first seal, the second seal encircling the second end of the sleeve.

12. The clamping mechanism of claim 11, the sleeve being positioned in a sleeve region having a longitudinal length, the sleeve having a longitudinal length less than the longitudinal length of the sleeve region.

13. The clamping mechanism of claim 12, the clamping mechanism further comprising a retaining device and a hollow body having retention structure, the first end of the sleeve being configured to be held against the retention device such that the second end of the sleeve is spaced from the retention structure of the hollow body.

* * * * *